United States Patent [19]
Crabb

[11] 3,862,492
[45] Jan. 28, 1975

[54] METHOD FOR PRODUCTION OF STATOR LEAD ANCHORING AND SPLICE-INSULATING SLOT INSULATOR STRUCTURE

[75] Inventor: William A. Crabb, Kent, Ohio

[73] Assignee: Ametek, Inc., New York, N.Y.

[22] Filed: July 20, 1973

[21] Appl. No.: 381,075

Related U.S. Application Data

[62] Division of Ser. No. 207,454, Dec. 13, 1971, Pat. No. 3,748,511.

[52] U.S. Cl. .................. 29/596, 29/628, 310/71, 310/215
[51] Int. Cl. ............................................. H02k 15/02
[58] Field of Search ........ 29/596, 598, 628; 310/71, 310/214, 215, 43, 194

[56] References Cited
UNITED STATES PATENTS

| | | | |
|---|---|---|---|
| 863,207 | 8/1907 | Olds | 310/71 |
| 2,872,599 | 2/1959 | DeYoung | 310/71 |
| 3,027,475 | 3/1962 | Gaudry | 310/43 X |
| 3,219,857 | 11/1965 | Fisher | 310/71 |
| 3,457,442 | 7/1969 | Charlton et al. | 310/71 |
| 3,664,017 | 5/1972 | Stone | 29/596 |

*Primary Examiner*—Carl E. Hall
*Attorney, Agent, or Firm*—P. D. Golrick

[57] ABSTRACT

An electric motor field or stator core slot insulating liner having a lead enclosing channel structure receives, and during coil winding holds, an insulated stator lead with one end slightly projecting for splicing thereto of a corresponding coil magnet wire end after completion of coil winding. The spliced lead end is drawn into the channel, thus affording splice insulation and lead anchoring; any subsequent stator impregnation with insulating varnish contributing to splice insulation and to lead anchoring effect of magnet coil pressure against the liner and channel. After winding lead insertion at times is preferable.

5 Claims, 6 Drawing Figures

PATENTED JAN 28 1975　　3,862,492

METHOD FOR PRODUCTION OF STATOR LEAD ANCHORING AND SPLICE-INSULATING SLOT INSULATOR STRUCTURE

This is a division of application Ser. No. 207,454 filed Dec. 13, 1971, now U.S. Pat. No. 3,748,511.

The present invention is discussed in terms of a field or stator for a two pole fractional horsepower motor, but it is to be understood that the disclosed structure and method have wider application in wound electromagnet structures, especially motors, having coils wound into core slots.

In wound electromagnet cores, particularly stator cores for electric motors with respect to which as a particular embodiment the present invention is disclosed, one or more coil winding wire ends are spliced to heavier more thickly insulated flexible wire lengths as leads by which electrical connections are made externally or to other parts of an apparatus of which the core is a component. In such structures, generally it is necessary to insulate the lead to magnet wire splice; and further to anchor the lead to the core, not only to fix its location, but also for stress relief to avoid possible splice damage by tension applied to the lead. To accomplish one or more of these ends prior practices, with or without an insulating sleeve or tape on the splice, have involved, for example, merely clamping a part of the lead to the stator; or installing apertured insulating tabs or plates of various forms in or on the stator, as for example, a projecting apertured tab on a slot insulating liner, with the lead splice end region engaged frictionally or by knotting in the apertures; or by so holding an insulated lead in a stator slot during coil winding that the lead is then in effect embedded and held in the slot by the finished wound coil.

These and other prior practices have suffered various disadvantages, such as inconvenience entailed, or tooling required, in the winding procedures for holding a lead, expense of the lead anchoring element itself or its handling and fabrication, or the necessity of applying special splice insulating means. With the embedment and so anchoring of the lead in the slot by the coil magnet wire wound therein, certain limitations are imposed on the insulation which may be used for the lead if damage to the embedded lead is not to occur.

By the present invention there is provided in a stator or other core slot, at a point where a coil terminating lead is to be located, a preformed and preferably self-retaining slot insulating liner, which may be comprised of conventional insulating sheet fiber stock, at least for its major structure; the liner having a channel or other formation extending longitudinally of the slot and adapted readily to receive and yet retain the lead wire with the lead end to be spliced projecting endwise slightly therefrom. Then with the lead thus held in place the coil magnet wire is wound onto the core in otherwise conventional manner. Thereafter, each such projecting lead has a corresponding magnet wire end spliced thereto, the spliced end is drawn into the channel, tightening up the end portion of the magnet wire, and bringing the splice itself into an insulating location.

Even when the core structure is not thereafter to be impregnated by an insulating varnish, with the lead-receiving channel appropriately shaped and disposed in its slot, the pressure of the magnet wire wound into the slot bearing against the channel formation region of the liner serves to develop adequate frictional lead anchoring forces. On the other hand, where the stator or core is subsequently impregnated, the insulating varnish between the channel surface and the lead may serve either alternatively or additively with frictional forces to anchor the lead; and moreover supply further insulation.

It is the general object of the present invention to provide an improved and simplified structure for anchoring a lead element provided for a coil in a dynamoelectric machine stator and like wound core structures. Another object is to provide a simplified lead anchoring structure in combination with a core slot insulating liner, which obviates need for taping or sleeving to insulate the lead-to-coil wire splice. A still further object is to provide an improved method of winding a core of the type described and providing an anchored, splice-insulating connection of a lead or leads to the coil winding.

Other objects and advantages will appear from the following description and drawing wherein.

Figure 1:
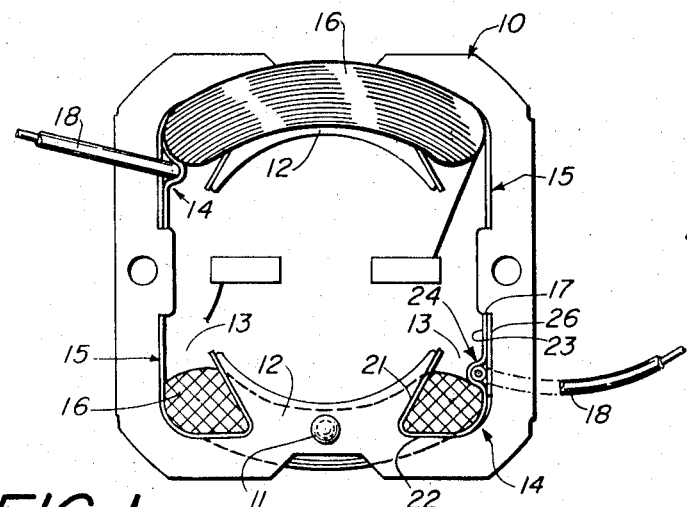
FIG. 1 is an axial end view of a wound motor core embodying structure of the invention, with certain portions broken away for clarity of representation.

In the drawings, the present invention is shown embodied in or as applied to the field or stator core of a two-pole fractional horsepower electric motor, in general conventional in structure and mode of fabrication, apart from the particulars hereinafter described as to structure and method.

In the stator shown in FIG. 1, the core 10, generally square in external outline, conventionally comprises a stack of like symmetric electromagnet iron laminations riveted into a unit by longitudinal rivets 11; and has, diametrically located relative to a rotor or armature receiving space, two opposed arcuately faced poles 12, each defined by a respective pair of longitudinal, i.e. axially running, slots 13, lined with respective slot lining insulators 14–15; a coil 16 of magnet wire being wound into each respective pole-defining slot pair, about the pole neck.

In each coil winding, usually insulating varnish coated solid magnet wire, one end is spliced and thus electrically connected to a heavier flexible wire lead 18, having a relatively thick layer of insulating plastic in modern practice; the other end being shown merely connected to a brush holder terminal.

Each liner or slot insulator is preformed generally to the cross-section of the similarly shaped stator slots, as shown by the liner 14 on FIG. 1, and, to conform generally to the wall portions of the slot, this feature being conventional. The liners 15 where leads 18 are not present can be totally conventional. Each lead anchoring liner 14 thus provides a straight or flat panel portion 21 against the flat inside slot wall and therefrom curves around in liner bottom 22 conforming to the slot bottom to run into a flat panel portion 23 against a straight part of the slot outside wall; and conventionally projecting at both axial ends from the slot.

At a location near the longitudinal slot mouth (when the liner is in place), that is, opposite the free longitudinal edge of the inside panel portion 21, the outer panel 23 is provided with a longitudinally directed lead-receiving channel formation generally indicated 24 here and in modifications, in which there is lodged the corresponding lead wire 18 in the finished structure; the channel structure affording, as hereinafter described in detail, a lead anchoring and splice insulating structure.

For particular environments, the channel 24 may be elsewhere located on the liner as required.

The slot insulating liner may be made principally of any conventional insulating fiber sheet such as fish paper hitherto commonly used for such purposes. The shape and resiliency of the material constituting the channel 24, however the latter is provided, are such that the splicing end of the intended lead 18 is conveniently insertable therethrough, while the lead is retained in position for winding purposes.

In addition to the structure thus broadly generally described, the liners may have as desired further structure for particular additional functions or cooperating relation with the stator; for example, the structure herein characterized may be embodied as part of a larger single insulator structure providing insulation for adjacent slots of successive poles, or may provide edge engagement with the stator for more positive positioning and retention of the liners until winding is started or completed.

The liner as such, as here shown, may project somewhat at each axial end of the slot in a usual fashion to provide additional end spacing of the windings from the core metal.

Figure 2:
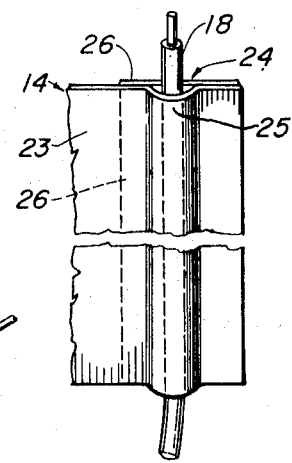
FIG. 2 is a fragmentary elevational view of a portion of a slot liner used in FIG. 1, apart from the core, showing both a part of the liner structure in clearer detail, and also indicating a condition of a lead at one point of the stator fabricating operation.

In the particular liner of FIGS. 1 and 2, to provide channel structure 24, the outer panel 23 has an inwardly deformed round-bottomed, trough formation 25, running the entire liner length and parallel to the fiber grain; and bonded on its outer face a longitudinal flat strip 26 of insulating material closing the trough longitudinally into a tubular receiving channel. The strip 26 can be pressure sensitive insulating tape, preferably with the adhesive being non-adherent to the insulation used on the lead to be inserted; or simply a laminated-on strip of the same sheet material as, and perhaps thinner than, the stock used for the main or body portion of the liner; or the liner stock, especially where heavy rag paper stock, may be bent back upon itself as described for FIGS. 3-4, to provide a cover for such trough 25.

Thus the splice end of a lead 18 may be pushed through such channel, and to a position where it is projecting from such channel, of an insulator liner 14 positioned in its slots.

Figure 3:
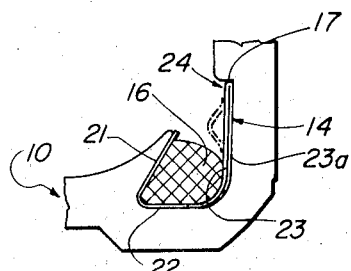
FIG. 3 is a fragmentary perspective view of a modification of the slot insulator structure.
Figure 4:
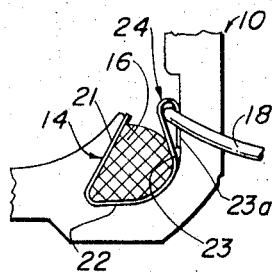
FIG. 4 is a fragmentary end view, partially in section, of a core showing another modification of the slot insulator.

In FIGS. 3 and 4 at and along the entire longitudinal free edge of the liner outer panel 23, the sheet material is reflected (in FIG. 3 rather sharply and flat upon itself, and in FIG. 4 through a rounded rather than a sharply creased fold) outwardly and backwardly upon itself in the backward fold 23a thereby to define the lead receiving channel 24. This general form is adapted generally only for inclusion in an overall liner structure intended for but a single slot. In FIG. 3, as compared with FIG. 4, the liner runs out to and the edge fold engages the slot shoulder 17 for retention upon placement in a known manner as also occurs in FIG. 1. Further the specific form of FIG. 3, with large fold over, conveniently allows insertion of a lead after winding.

Figure 5:
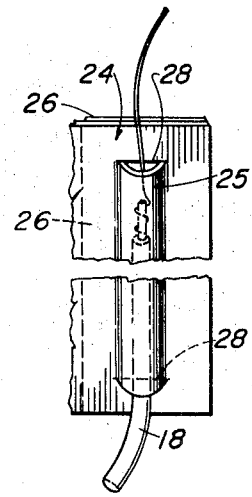
FIGS. 5 and 6 are fragmentary views of still further modifications of the insulator structure.
Figure 6:
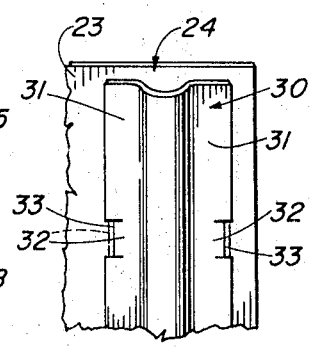

FIGS. 5 and 6 present examples of further modifications of slot insulator form.

In FIG. 5 the longitudinal channel structure 24, as in FIGS. 1-2, is provided by a longitudinal inward deformation of the sheet material into a rounded trough 25 between the short parallel slits 28 incised somewhat inward from the respective ends of the liner, the grain of the liner again running parallel to its length; with the resultant open trough side closed by a longitudinal insulating material strip 26 applied thereover. In contrast to leaving the trough open, this form is preferred to provide a full splice insulating function, as will be described.

In the liner form of FIG. 6 the outer wall panel 23 is generally straight and flat; and the channel 24 is provided by a piece of preferrably thinner fibrous insulating material 30 formed with a longitudinal trough, which being applied to the outer panel forms therewith a tubular channel. Here strip element 30, at its midsection, has the respective longitudinal edges of the flat margins 31 sheared into opposed tabs 32 which are tucked into and through respective spaced parallel slots 33 incised in the main liner panel 23, thereby to secure the added piece in position. The tabs may be further secured by adhesive if required in particular uses; the added piece being on the inside face or outside face of the outer panel as may be convenient or required by other design or fabrication considerations.

The forms of FIGS. 5 and 6 are especially applicable for fibrous liners which are of the so-called end-cuffed types, since in contrast especially with FIGS. 1, 3, and 4, the cuffed portions would not have to be bent inwardly and would not interfere with the lead receiving channel; although those of FIGS. 1, 3, and 4 may be also embodied in such cuffed liners, especially with modification to eliminate cuffing at the channel region.

As the stator stack in fabricating operations proceeds to the winding operation, the appropriate slot liners are emplaced; each lead wire 18 is inserted into the liner channel formation at its respective position with its splicing end projecting somewhat from one channel end as suggested by FIG. 2; the ends of the lead wires being bent out of the way as might be necessary for the winding equipment; and the windings are then applied, in usual fashion.

After the coil winding operation is completed, the appropriate splices of the coil magnet wire ends are made to respective leads; and the spliced ends are drawn into the channels by pulling on the longer free opposite ends thereby bringing each splice into the respective channel formation, the channel formation acting as an insulating tube, which serves both to insulate the splice as well as anchoring means for the lead end. Thereby at the same time, with an appropriately made splice with not too much "slack" in the adjacent magnet wire end portion, the latter may be drawn down into snug position on the winding. The splice as such, that is, the physical and electrical connection of the magnet wire to the lead end, may be made in any suitable manner; for example by soldering, or by use of a crimped-on connector.

The lead anchoring structure here disclosed is useful where it is desired to insert the lead wires after winding is completed, though before impregnation; in which case, the lead may be spliced either before or, as above, after insertion. With after winding insertion, especially with the FIG. 3 liner, a guide and/or feed tool passed between the folded over part and the main part of the liner may be used to assist the lead insertion, with local bowing as dot-dashed in FIG. 3.

With the lead receiving channel 24 so located that for the intended winding fill of the slot, the windings come to bear upon either an inwardly deformed or projecting channel portion or, where the channel formation, however provided, projects outwardly toward the iron, by pressing the adjacent main wall portion of the liner toward the iron, a sufficient frictional engagement can be developed, adequately to secure the lead and take up any strain that might reasonably be expected to be applied to the lead, thus protecting the splice. Moreover, even where such winding pressure force is not intended to be developed, or the formation 24 is to be located beyond its effect, but the stator is subsequently impregnated with an insulating varnish, the channel provides a long region of contact and adjacent spaces for varnish filling thereby to varnish bond and effectively secure the lead within the channel, to ensure a strain relief arrangement for the splice region. Such varnish impregnation will be also additional to any winding pressure type lead securing forces that are in fact previously developed.

With this arrangement of FIGS. 1-2 or 5, even absent the channel covering element 28, there is provided at least a lead anchoring structure with which, after coil winding, the projecting portion of the lead may be spliced to the respective coil wire end, the splice being taped or sleeve-insulated. Then the lead may be left in projecting position; or if adequately insulated, the splice may be drawn inward; either partially, to be located just outside the channel end where, for FIG. 3, a residual undeformed portion of the liner is interposed between it and the stator core iron, or else drawn completely into the channel with reliance upon the splice insulation to prevent shorting to the iron.

If for example the form of FIG. 5 is used with subsequent varnish impregnation, after an appropriately formed splice is made to the lead, with little wire "slack" between the splice and where it merges into the main coil body, the lead may be drawn inward from the position shown in FIG. 5 not so far as to bring the insulation-free splicing end region of the lead into the channel, but merely into the region between the very end of the liner and the end of the channel, whereby the splice region is insulated from the iron, with the impregnating varnish then further insulating the splice itself.

Some of the aforegoing channeled liner forms may be preferable to others where it is desired to inventory liner stock material say in rolls providing continuous strip stock from which portions are successively sheared in equal lengths corresponding to the desired liner lengths, perhaps first passing through forming dies to fully or partially preform the stock. Thus the liner of FIG. 4 may be made from coil strip stock having a width equal to the developed length of the liner cross-section passed through forming dies before shearing. Or two-ply laminated stock of width equal to the developed length of the FIG. 1-2 liner, having the plies non-adherent along a line longitudinal of the strip at the desired location of the channel, may be subjected to tooling action, before or after shearing, to apply opposed forces directed in the plane of the stock toward the line of non-adherence to expand the plies away from each other, and so produce the tubular channel.

For the other forms here shown, even those of FIGS. 1-2 or 5, the stock comprised of the main liner, preformed with the longitudinal trough and with the trough-covering strip applied, would be bulkier in storage and form.

Insulating flexible plastic material, which is not readily cold flowable and is extrudable to a desired cross-section, offers an advantageous material for the liner, since it can be produced continuously with a longitudinal tubular formation in indefinite lengths from which individual liners may be severed.

I claim:

1. A method of fabricating an electromagnetic structure having an iron core with at least one mouth slot with inner, outer and joining wall surfaces,
    a coil of wire wound on said core and into said slot,
    a lead element having a splicing end spliced to one end of the coil wire, and
    a slot insulating liner of insulating, generally sheet-like, material interposed in said slot between the coil wire and the walls of said slot,
the steps of
    preforming a said slot insulating liner to have an inner panel, an outer panel and a portion joining said panels for general conformity respectively to said inner outer and a joining wall surfaces of the slot, and to have a channel structure extending longitudinally of the liner, and adapted to form a channel insulatingly receiving a portion of the length of a said lead element at the splicing end to be retained therein;
    providing a said core having a said slot therein; emplacing a preformed said slot insulating liner in the said slot;
    inserting a said lead element in said channel structure with its splicing end projecting endwise from the channel; winding wire into the slot to provide a core winding with a wire end adjacent said splicing end; and splicing said ends.

2. A method as described in claim 1 of fabricating a said electromagnetic structure as a stator for an dynamo-electric machine, wherein said core is provided as a stator core having a plurality of said slots with at least two poles defined by said slots;
    slot insulating liners are emplaced in the respective slots with at least one of the slots having a said preformed channel structure into which a said lead element is inserted with its splicing end projecting endwise from the channel; and
    wire is wound into the slots to provide stator windings with a wire end adjacent said splicing end for the described splicing of said ends.

3. The method as described in claim 1 wherein said channel structure is provided as an insulating tubular structure and including the further step of pulling the free end of said lead element to draw the splice into said channel structure.

4. The method as described in claim 2 including the further step of impregnating the wound stator after completion of the splicing.

5. The method as described in claim 1 wherein the channel structure is so located that pressure of wire wound into the respective slot is communicated through the liner to the lead element in said channel structure.

* * * * *